United States Patent [19]
Kacheria

[11] Patent Number: 5,708,749
[45] Date of Patent: Jan. 13, 1998

[54] LIGHTING APPARATUS AND METHOD

[75] Inventor: Nilesh P. Kacheria, Bombay, India

[73] Assignee: Fiberstars, Inc., Fremont, Calif.

[21] Appl. No.: 713,603

[22] Filed: Sep. 13, 1996

Related U.S. Application Data

[63] Continuation-in-part of Ser. No. 522,568, Sep. 1, 1995, abandoned.

[51] Int. Cl.$^6$ .................................................. G02B 6/02
[52] U.S. Cl. ........................... 385/123; 362/32; 385/31; 385/901
[58] Field of Search ........................... 362/32; 385/31, 385/39, 123, 146, 147, 901

[56] References Cited

U.S. PATENT DOCUMENTS

| | | | |
|---|---|---|---|
| 3,535,018 | 10/1970 | Vasilatos | 385/115 |
| 3,829,675 | 8/1974 | Mariani | 385/901 X |
| 4,422,719 | 12/1983 | Orcutt | 385/147 X |
| 4,761,047 | 8/1988 | Mori | 385/901 X |
| 5,187,765 | 2/1993 | Muehlemann et al. | 385/901 X |
| 5,233,679 | 8/1993 | Oyama | 385/146 |
| 5,380,318 | 1/1995 | Daikuzuno | 606/16 |
| 5,432,876 | 7/1995 | Appeldorn et al. | 385/31 |
| 5,542,017 | 7/1996 | Koike | 385/123 |

FOREIGN PATENT DOCUMENTS

| | | | |
|---|---|---|---|
| 58-1103 | 1/1983 | Japan | 385/901 |
| 58-1104 | 1/1983 | Japan | G02B 5/14 |
| 58-7603 | 1/1983 | Japan | G02B 5/14 |
| 61-172105 | 8/1986 | Japan | 385/901 |

OTHER PUBLICATIONS

B-K Lighting, Inc.—Glow Star Series Product Brochure, 3 pp., no date.
Architectural Landscape Lighting—Garden Landscape Series Product Brochure, 2 pp, no date.
Lumiére Design and Manufacture, Inc. Product Brochure, 5 pp, no date.

*Primary Examiner*—John D. Lee
*Attorney, Agent, or Firm*—Albert C. Smith; Fenwick & West LLP

[57] ABSTRACT

Lighting apparatus and method includes a body of optically transparent material including selected interior and exterior surface portions that are polished or otherwise smoothed to promote internal reflections of light flux and to inhibit lateral emission of internal light flux. Other selected portions of the interior or exterior surfaces are modified from smooth to refract or diffuse internal light flux for lateral emission of light flux from such surface portions of the body. The modified surface portions of the body may include grooved or otherwise roughened regions to a depth that inhibits surface wetting to relatively smooth surface condition which would diminish lateral emission of internal light flux. Alternative surface conditions for refracting or diffusing internal light flux to laterally-emitted light flux may be provided by laminated or layered light diffusers such as plastic tape or adhered glass or plastic beads.

18 Claims, 3 Drawing Sheets

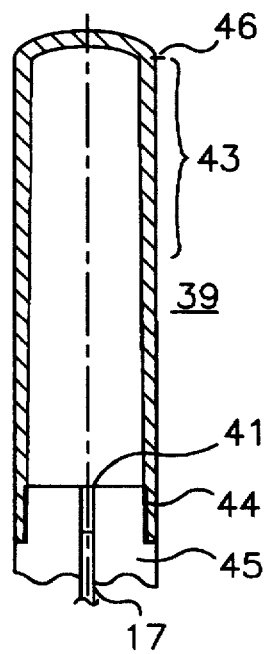
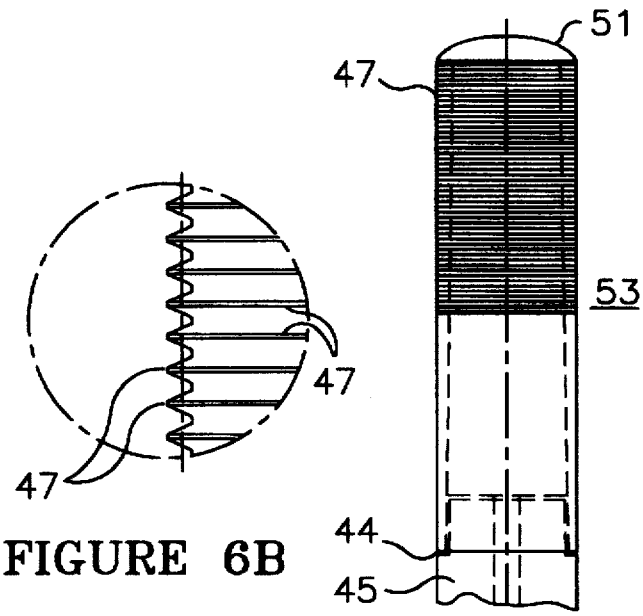
FIGURE 5
FIGURE 6B
FIGURE 6A
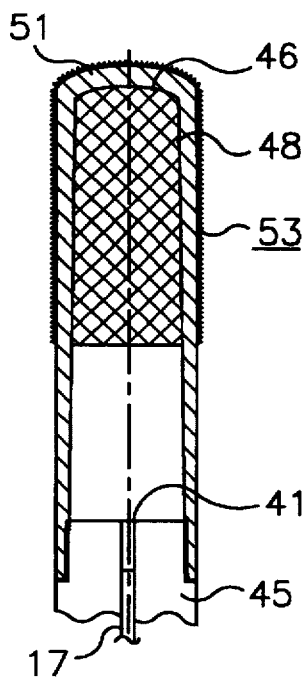
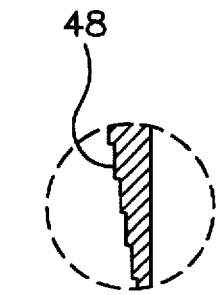
FIGURE 7A
FIGURE 7B 5,708,749

LIGHTING APPARATUS AND METHOD

RELATED APPLICATION

This is a continuation-in-part application of application Ser. No. 08/522,568, entitled "Lighting Apparatus and Method" filed on Sep. 1, 1995 by Barry R. Greenwald and Nilesh P. Kacheria, now abandoned.

FIELD OF THE INVENTION

This invention relates to optical lighting apparatus and method, and more particularly to an improved lighting fixture and method for illuminating a local region with light flux that is laterally emitted from a selected region of the lighting fixture and that is inhibited from lateral emission in other regions of the lighting fixture to produce an appearance of an isolated emitter of light flux that is visually dissociated from a source of light.

BACKGROUND OF THE INVENTION

Certain known fiber optic lighting techniques rely upon polished and coated optical fibers to assure that light flux supplied to an end of the fiber is transmitted to a distal end of the fiber with minimal loss of light flux due to lateral emission of the light flux at surface anomalies over the length of the fiber between the ends thereof. Optical fibers of this type are commonly described in the literature (see, for example, U.S. Pat. Nos. 3,536,908; 4,569,334; 4,454,568; 4,425,907; 4,025,779; 3,775,606; 3,733,481; and 4,564,261).

Other types of optical fibers are known in which surface anomalies and anomalies within the core of the fiber along the length thereof promote lateral emission of light flux from the surface of the fiber to provide a lineal lighting mechanism for flexible positioning in decorative lighting applications. Optical fibers of this type are described in the literature (see, for example, U.S. Pat. Nos. 4,763,984; 5,345,531; 5,416,875; 4,128,332; 3,208,174; 4,422,719; 4,466,697; 3,497,981; 3,389,247; 2,173,371; 2,058,900; and 4,637,686). Alternatively, optical fibers of large cross sectional dimension resembling light rods are known to be useful for displacing a light source from the location at which area illumination is desired, and such light rods are also described in the literature (see, for example, U.S. Pat. No. 3,813,514).

SUMMARY OF THE INVENTION

In accordance with the illustrated embodiment of the present invention, an improved lighting fixture is optically coupled to receive light flux directly from a proximate source of light flux, or indirectly via optical fibers from a remote source of light flux. In one embodiment, a light rod is a solid body that includes surfaces that are selectively polished and selectively modified in order to provide area illumination in a decorative manner that emits light flux substantially only from the selectively modified surfaces thereof. In another embodiment, the lighting fixture may include a hollow body with surfaces that are selectively modified in order to provide adequate lateral illumination from light flux supplied to the fixture via optical fibers. Each embodiment of the lighting fixture may be disposed in adverse environments such as in outdoor applications exposed to weather, and adjacent pool or spa locations where proximity to electrical connections should be avoided. The ability of the selectively modified surfaces of the lighting fixture to emit light flux are substantially unaffected by moisture or surface wetness attributable to rain or water splash from proximate water sources.

DESCRIPTION OF THE DRAWINGS

FIG. 5 is a sectional view of another embodiment of the present invention;

FIGS. 6A and 6B are, respectively, a plan view and exploded partial plan view of the embodiment of FIG. 5; and FIGS. 7A and 7B are, respectively, a sectional view and an exploded partial sectional view of an exterior globe of another configuration for operation in the embodiment of FIG. 5.

DESCRIPTION OF THE PREFERRED EMBODIMENT

Figure 1:
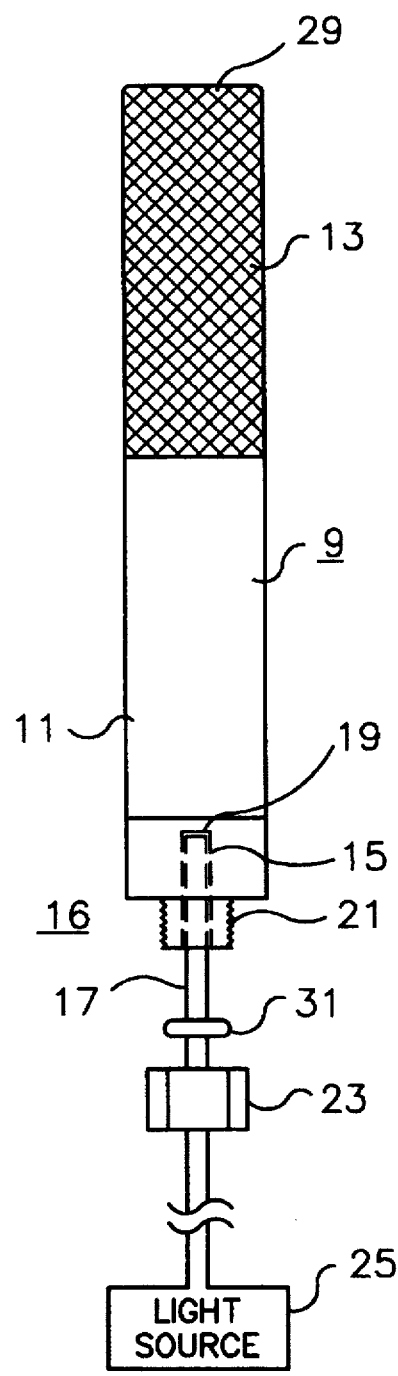
FIG. 1 is an exploded plan view of the lighting apparatus according to one embodiment of the present invention.
Figure 2:
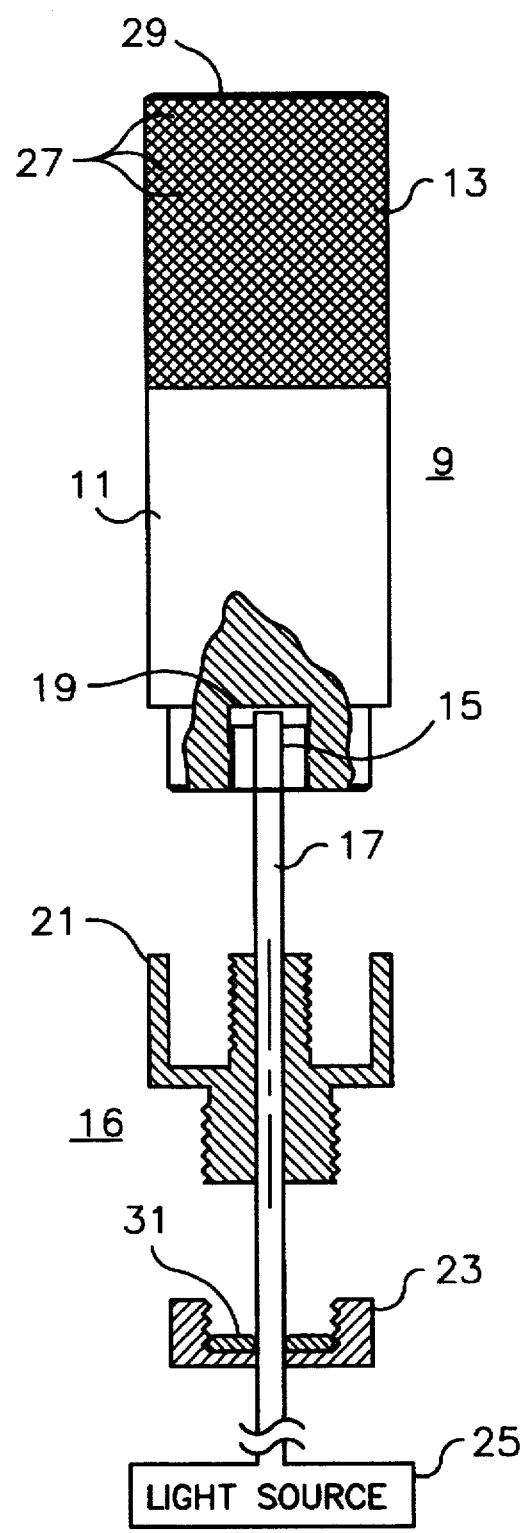
FIG. 2 is an exploded partial sectional view of the lighting apparatus and end cap for mechanically attaching optical fibers to the lighting apparatus of FIG. 1.
Figure 3:
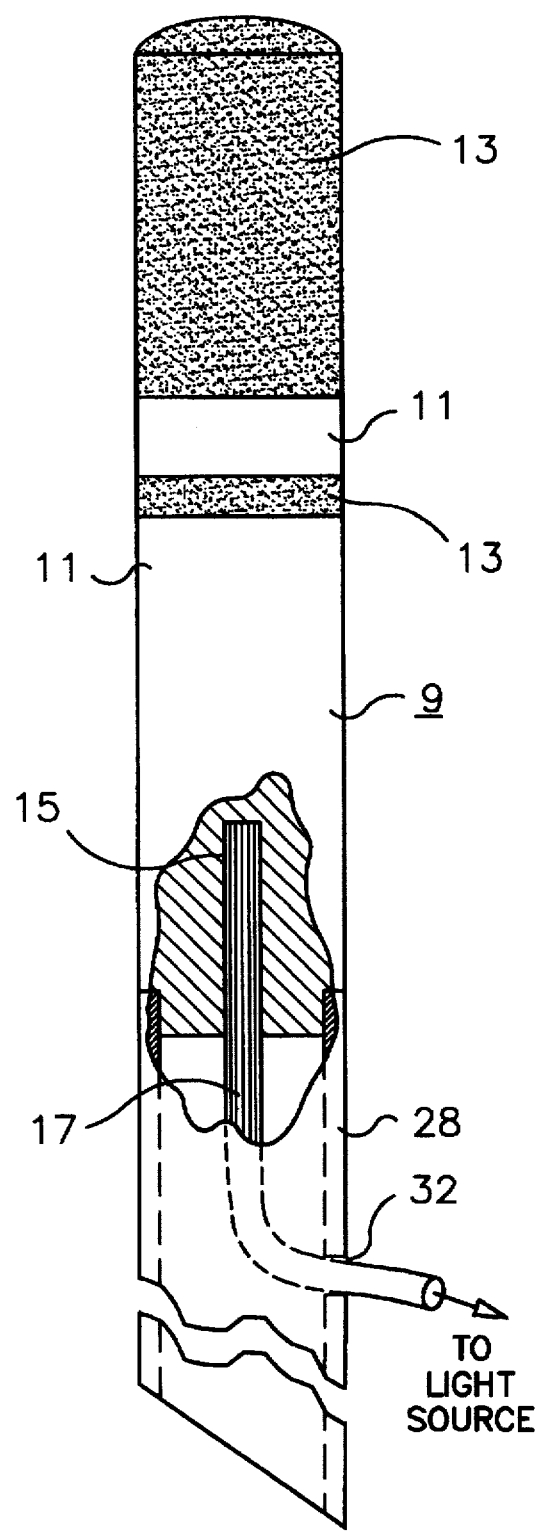
FIG. 3 is a partial sectional view of another embodiment of the present lighting apparatus in which optical fibers are glued in place and the lighting apparatus is press-fitted to a supporting element.

Referring now to FIG. 1, there is shown an exploded plan view of an improved lighting apparatus including an elongated solid body 9 of a transparent optical material such as glass or a plastic material of high refractive index such as methyl methacrylate, with an exterior surface 11 in a first or lower region thereof that is smooth and polished to remove substantially all surface anomalies, blemishes, and irregularities, and with a second or upper region thereof 13 that is specifically roughened to promote refraction or selective emission of light flux from the surfaces of the apparatus. The lower end 11 of the apparatus includes a recess 15 that is disposed to receive a plurality of optical fibers 17 therein with ends thereof substantially in contact with the inner end 19 of the recess, and with the optical fibers substantially aligned along the longitudinal axis of the body 9. The optical fibers may be retained in position within the recess 15, preferably with the ends of the fibers in contact with inner end 19 of the recess 15, by a ferrule or end cap 21 of the type shown in sectional view in FIG. 2. The ferrule or end cap 21 thus forms a conventional compressional attachment around the optical fibers 17 in response to tightening of an external gland nut 23. In addition, the ferrule 21 may be screwed into, or otherwise attached to the body 9 as by adhesive, jam-fit, and the like. In this manner, the ferrule 21 attaches to the body 9 and the optical fibers 17 are retained in the ferrule 21 by resilient compression washer 31 for mechanical rigidity and alignment with the longitudinal axis of the body 9. Alternatively, the optical fibers 17 may be adhesively attached within the recess 15 using clear glue or epoxy. A light source 25 of conventional design may be attached to the other ends of optical fibers 17, or may be directly attached to the lower end of the body 9 in order to couple light flux from the light source 25 into the body 9 in conventional manner without intermediate coupling there between provided by optical fibers or light rods. As illustrated in FIG. 3, the body 9 may be directly attached as by jam-fit or adhesive attachment to a hollow stake or pipe 28, with a plurality of optical fibers 17 adhesively attached to the body 9 within recess 15, and extending through the hollow stake 28 and through an aperture 32 in the side of the stake 28 to facilitate both mounting the body 9 and orienting the plurality of optical fibers between the body 9 and a light source 25.

In accordance with the illustrated embodiment of the present invention, the upper region 13 of the body 9 includes surface anomalies 27 from smooth that are specifically prepared to obviate or mitigate the effect of water or oil, or the like, on the flux-emitting or refracting ability of the surface anomalies. Specifically, the external surface of the upper region 13 of the body 9 is prepared in one embodiment in conventional manner with a medium diamond knurl that penetrates the surface by approximately 0.010" to provide numerous facets among surrounding grooves on the exterior lateral surface from which light flux within the body 9 may refract and be emitted out of the upper surface 13 of the body 9. In another embodiment, the upper surface 13 of the body 9 may be grooved in thread-like spiral manner, or may be grooved with concentric rings where, in each case, the grooves are tapered or v-shaped to a depth of about 0.005" to about 0.100", and with a density of about 8 to 50 grooves per inch of length along the longitudinal axis of the body 9.

Alternatively, the upper surface 13 of the body 9 may be roughened by sand blasting with coarse sand to produce a refracting or diffusing surface having surface anomalies from smooth with average peak-to-valley dimensions not less than about 0.005", and with peak-to-peak average spacings of not less than about 0.005". The upper surface 13 thus prepared in accordance with any of the aforementioned schemes assures that water or oil that might contact and wet the surface by 'filling in' or otherwise smoothing out surface anomalies will not significantly diminish the ability of the upper surface 13 to refract or diffuse internal light flux to lateral emission out of the body 9.

The end surface 29 of the body 9 may be polished to inhibit refraction of light flux from within the body 9 through the upper end thereof for applications where it is desirable to have light flux emitted substantially laterally only from the upper surfaces 13 and not from the polished lower surface 11 or from the upper end 29 of the body 9. Alternatively, other end shapes such as cones, hemispheres, pyramids, tapers and truncates, and other cross-sectional shapes of body 9 such as square, cylindrical (as shown), rectangular, cross-like, triangular, conical, pyramidal, and the like, may be used, with refractive or diffusive upper surfaces and ends prepared and oriented as previously described. Other surface treatments may be used to provide numerous surface facets capable of refracting or diffusing light flux from within the body 9 including grinding or casting or cutting grooves or otherwise forming facets among surrounding grooves within selected surfaces 13 of the body 9 to a depth that will not 'fill in' and be wetted or smoothed out in contact with water or oil. Alternatively, a laminate or cladding of diffusive or refracting material such as clear glass or plastic substantially spherical beads may be adhered or otherwise assembled on the upper surfaces 13 and end 29 of body 9. In another embodiment, a layer of light-diffusing tape of about 0.001" thickness may be adhesively attached to the body 9 near the upper end thereof, and, of course, materials of various colors may be included in the structure to provide visually-appealing decorative lighting. Optional bands or stripes of opaque or visually contrasting material may be positioned in selected patterns about the diffusive or refractive surface regions of the body 9 to provide visual separations or divisions of segments of the surface from which light flux within the body 9 emanates. The dimensions of beads, or grooves or other anomalies from smooth have been found to be beneficially within the range from about 0.001" to about 0.100", and ideally should be about 0.030" for lighting applications likely to come in contact with water. The upper region 13 of the lateral surfaces of the body 9 may be formed in decorative patterns of rings or columns of alternate smooth and refractive or diffusive surfaces of the type previously described, with contrasting colors as desired, to promote lateral emission of light flux from within the body 9 in selected surface patterns. The body 9 may thus be supported, for example, attached to a stake 28 positioned in the ground, in substantially upright position with the lower end 16 (and attached ferrule 21, if one is used) disposed below the lower surface region 11 buried in the ground for decorative and efficient lighting of the adjacent area.

In each of the embodiments of the invention disclosed herein in which light flux is supplied to the body 9 via optical fibers 17, such fibers may include conventional low-loss, point-to-point transmission type of fibers that provide high-efficiency transmission of light flux from light source 25 to the body 9. As used herein, 'upper' and 'lower' surfaces of the body 9 are relative to the vertical orientation of body 9, as illustrated in FIGS. 1–4 by way of example only, and should also be considered as describing surface regions of the body 9 that are spaced apart, for example, horizontally or along a bend or a curve of a body thus disposed.

Figure 4:
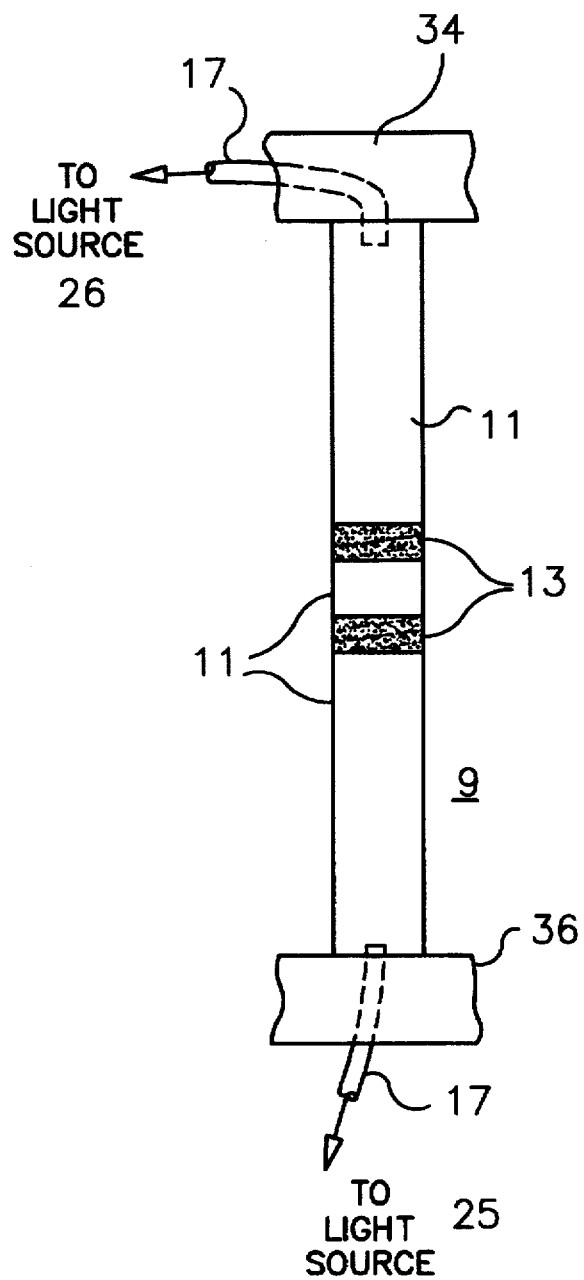
FIG. 4 is a partial view of an elongated body that is illuminated from both ends for horizontally-or vertically-oriented decorative lighting effects.

As illustrated in FIG. 4, the body 9 may serve as a decorative pillar or post between an upper lintel or cross member 34 and a lower foundation or ground support 36, and be illuminated from both ends in vertical orientation by a light source 25, or light sources 25, 26 that supply light flux either directly to ends of the body, or supply the light flux thereto via a plurality of optical fibers 17. Alternatively, a body 9 may be orientated horizontally, for example, as a segment of hand rail, and be illuminated similarly from both ends. In each such application of double-ended illumination, at least one surface segment 13 along the length of the body 9 includes a refractive or diffusive roughened surface of a type as previously described at a location, or locations, intermediate the illuminated ends.

Referring now to the sectional view of FIG. 5, there is shown another embodiment of the lighting apparatus of the present invention in which the elongated body 39 is substantially hollow above the output ends of the optical fibers 17. The elongated body 39, or globe, may be formed of glass or plastic material having a refractive index higher than air, such as methyl methacrylate, and may include a diffusive surface region 43 near the upper region thereof remote from the ends 41 of optical fibers 17 that are coupled to a light source (not shown) to supply light flux to the globe 39. The globe 39 may include a recess near the proximal end 44 for convenient attachment to the base 45, for example, via adhesive or press-fit or ultrasonic weld attachment, and may include an interior surface that is tapered convergingly with length toward the distal end 46 for convenient molding and withdrawal from a mold. In this embodiment, the diffusive surface region 43 includes ridges that are molded or cut into the material of the globe 39 in the manner, and with dimensions as previously described herein. Alternatively, the exterior surface may incorporate substantially cylindrical or axial ridges 47 that are formed as illustrated in FIGS. 6A and 6B to promote lateral diffusion of light flux from the globe 39 in response to light flux supplied thereto through the ends 41 of the optical fibers 17.

Alternatively, as illustrated in the sectional view of FIGS. 7A and 7B, the interior surface 48 of the hollow globe 39, for example, near the distal end 46 thereof, may include diffusive surface treatment to enhance lateral emission of light flux supplied thereto through the ends 41 of the optical fibers 17. For example, the interior surface 48 may comprise a plurality of incremental tapers and steps as illustrated to facilitate convenient molding and withdrawal from a mold, and to promote lateral emission of light flux supplied thereto via the ends 41 of the optical fibers 17. Alternatively, grooves or bands of diffusively roughened surface or other diffusive surface treatments may be machined or otherwise formed on the interior surface of the globe following casting to provide similar light diffusive properties. Such bands or grooves on the inside surface may be oriented in alignment or out of alignment with bands or grooves on the outside surface for distinctive aesthetic lighting effects. Optical fibers 17 may be retained within the base 45 via attachment to an outer sleeve or bands of material surrounding the fibers, or using adhesive, or compression fittings, or the like, to retain the ends 41 of the optical fibers 17 at selected location relative to the base 45 and globe 39 attached thereto. In this way, an inexpensive weatherproof lighting fixture that is conducive to electrically safe orientation in and around wet locations such as adjacent swimming pools and spas and lawn or garden areas, may be formed and installed at low cost and with a high degree of immunity to wet and adverse environmental conditions.

Of course, other embodiments illustrated and described herein using solid bodies may also be formed according to this embodiment with hollow bodies and exterior or interior, or both, diffusive surface regions 53 for efficient lateral emission of light flux supplied thereto. Additionally, the remote end 51 of the globe 39 may be formed as a separate component for press fit or adhesive attachment to the cylindrical portion of the globe 39, and such remote end 51 may also incorporate exterior or interior, or both, diffusive surface regions of a type similar to the diffusive surface regions described and illustrated herein. Also, an additional base 45 for supporting optical fibers 17 therein may be attached to a globe 39 in place of a remote end 51 to provide light flux to the globe from both ends thereof. And, one or more of the globe 39, remote end 51, and base 45 may be conveniently molded in longitudinally or axially-parted segments for assembly using adhesive, ultrasonic bonding, snap-fittings, and the like, to provide the general configuration of lighting fixtures as described and illustrated herein.

What is claimed is:

1. A light emitter for light flux supplied thereto comprising:
   a body of substantially optically transparent material having side walls between ends thereof forming exterior and interior surfaces and being disposed to receive light flux on the interior surfaces from a location near at least one end and having another end disposed remote from the one end; and
   said body includes a portion of the interior surfaces thereof between the ends thereof that is modified from smooth to provide refraction emission of light flux therethrough from light flux received within the body.

2. A light emitter according to claim 1 further comprising:
   a source of light flux coupled to said portion of the interior surface of the body for supplying light flux thereto from said one end thereof.

3. The light emitter according to claim 1 wherein said body includes portions of the interior and exterior surfaces thereof that are substantially smooth without anomalies for substantially inhibiting refraction of light flux therethrough at a location between the ends thereof, and includes said modified portion of the interior surfaces thereof, at another location between the ends thereof.

4. The light emitter according to claim 1 wherein a portion of the exterior surface of the body is modified from smooth including a plurality of grooves that refract light flux from within the body.

5. The light emitter according to claim 4 wherein a portion of the exterior surface thereof includes a plurality of grooves substantially about the side walls and laterally spaced between ends to modify the surface from smooth for enhancing lateral emission therethrough of light flux from within the body.

6. The light emitter according to claim 4 wherein said grooves penetrate the surface of the body to a depth of not less than about 0.005".

7. The light emitter according to claim 1 wherein said body includes a modified portion of the exterior surface that is substantially coextensive along the sidewalls with the portion of the interior surface that is modified from smooth for enhanced refraction emission of light flux therethrough from within the body.

8. The light emitter according to claim 1 comprising:
   fastening apparatus disposed at one end of the body to retain a plurality of optical fibers at said one end for coupling light flux in optical fibers at said one end at least to said portion of the interior surfaces of the body that are modified from smooth.

9. The light emitter according to claim 1 wherein a portion of interior surface is tapered from said one end toward said another end.

10. The light emitter according to claim 1 wherein the interior surface includes a plurality of substantially stepwise reductions in thickness of the sidewalls between the ends of the body.

11. The light emitter according to claim 1 including an end wall between sidewalls at said another end remote from the one end of the body.

12. The light emitter according to claim 11, in which at least one of the interior and exterior surfaces of said end wall includes modifications from smooth to enhance refracted emission of light flux therethrough from within the body.

13. The light emitter according to claim 1 wherein the portion of one of the interior or external surfaces includes a plurality of substantially spherical beads disposed thereon.

14. The light emitter according to claim 1 wherein the portion of the interior or external surfaces includes a laminate or layer of tape providing light diffusion or refraction of light flux.

15. A method of forming a light emitter in a body of substantially transparent material comprising the steps of:
   forming a body having sidewalls including interior and exterior surfaces between ends of the body;
   selectively modifying a portion of at least the interior surfaces of the body to form a light-refracting surface for enhancing refraction of light flux therethrough from within the body.

16. The method according to claim 15 wherein the step of modifying portions of the surfaces of the body includes forming an enhanced lateral light flux emitting portion of the exterior surface of the body that is substantially co-extensive with the portion of the interior surface that is modified from smooth between the ends of the body.

17. The method according to claim 15 in which the step of selectively modifying comprises:
   selectively forming a plurality of recesses in the interior surface of the body to form a light-refracting surface for enhancing refraction of light flux from within the body through the recesses.

18. The method according to claim 17 wherein the step of forming the recesses in the interior surfaces of the body includes varying the surface of the body from smooth to a depth of not less than about 0.005".

* * * * *